R. E. HARRIS.
LOCKING DEVICE FOR MOTOR VEHICLES.
APPLICATION FILED OCT. 14, 1920.
1,382,190. Patented June 21, 1921.
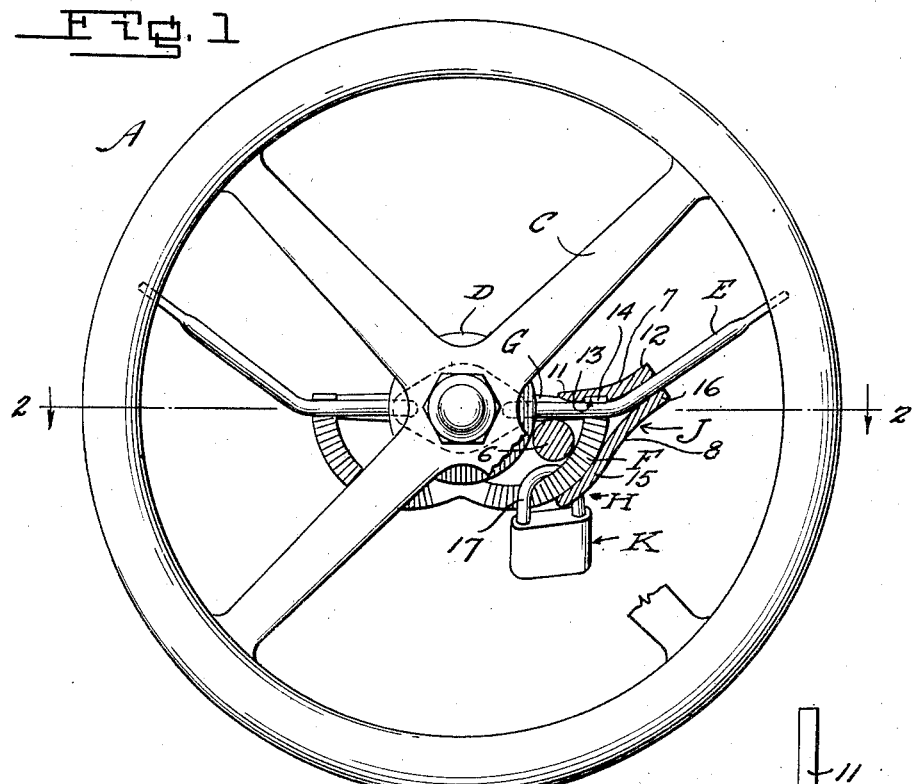
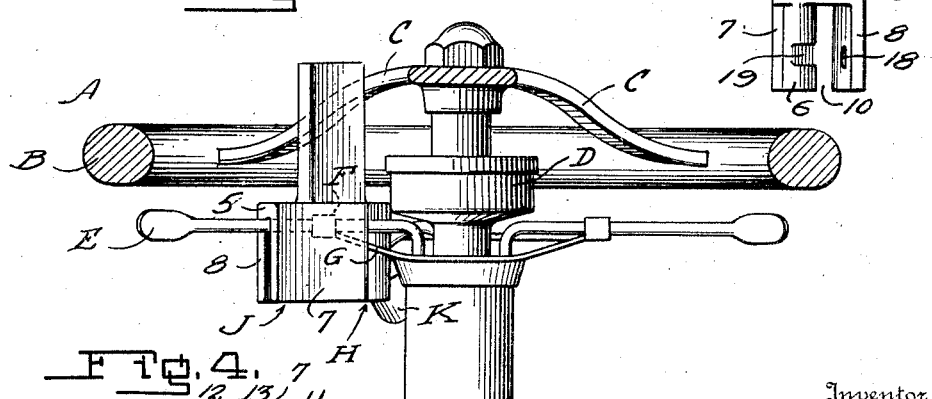
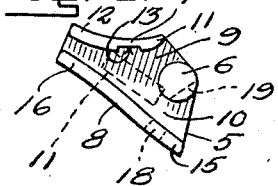
Robert E. Harris, Inventor

UNITED STATES PATENT OFFICE.

ROBERT E. HARRIS, OF EL PASO, TEXAS.

LOCKING DEVICE FOR MOTOR-VEHICLES.

1,382,190.  Specification of Letters Patent.  Patented June 21, 1921.

Application filed October 14, 1920. Serial No. 416,986.

*To all whom it may concern:*

Be it known that I, ROBERT E. HARRIS, a citizen of the United States, residing at El Paso, in the county of El Paso and State of Texas, have invented certain new and useful Improvements in Locking Devices for Motor-Vehicles, of which the following is a specification.

The present invention relates to locking devices for Ford automobiles and trucks, which have a particular steering and control mechanism, such that the steering wheel is above the throttle and spark levers, which levers are provided with individual quadrants. Other features of this steering and control mechanism particularly noticeable in contradistinction to steering and control mechanisms of other makes of automobiles and trucks are that a relatively small arc of movement of the steering wheel is necessary to cause considerable turn of the vehicle from a straight path of movement, and the throttle lever is moved away from the operator to close the throttle.

The invention herein disclosed is an embodiment of the principle disclosed in my copending application for patent on locking devices for motor vehicles, filed October 14, 1920, Serial #416,984.

The principal object of the present invention is to provide a locking device particularly well adapted for Ford automobiles and trucks which may be readily disposed into operative relation to the steering wheel, throttle lever and its quadrant, to limit the amplitude of circumferential movement of the steering wheel and to prevent movement of the throttle lever from a closed position and which may be readily placed into and removed from operative relation to these parts, is inexpensive to manufacture and which will make it impossible for an unauthorized person removing the device by manipulation.

Other objects and advantages of the invention will be in part described and in part understood by reference to the following detailed description, reference being had to the accompanying drawings in which:

Figure 1 is a plan view of a Ford steering wheel, control levers and quadrants, and with a locking device formed and assembled in accordance with my invention applied thereto, the body portion of the locking device being shown in section to disclose its relative position to parts of the vehicle.

Fig. 2 is a sectional view on the line 2—2 looking in the direction of arrows.

Fig. 3 is an elevation of the body of the locking device.

Fig. 4 is a plan view of the same.

In the drawing where similar characters refer to similar parts throughout the views, A designates a steering wheel mechanism including a rim B and spokes C and gear case D of the usual type on vehicles of the character described; E the throttle control lever; F the quadrant thereof which is provided with an upwardly extending radial arm G connected to the quadrant F below its terminal; and H a locking device including a body J for engagement with the spokes C, case D, lever E, quadrant F, and arm G, and a lock K.

The body J is preferably made of a single piece of metal having an intermediate portion 5 from one side of which extends projections or fingers 6, 7 and 8 providing converging ways 9 and 10 and from the other side a projection 11 adapted to extend between the spokes B, when the locking device is in place, and limit the amplitude of circumferential movement of wheel A.

The finger 6 is preferably round in cross section and flush with the edge of intermediate portion 5 as clearly shown in Fig. 3 of the drawings so as to slip in between quadrant F and gear casing D and extend substantially therebetween.

The finger 7 is preferably of flange like formation, angular in cross section one angular section 11 of which engages the quadrant arm G at its outside and the other angular section 12 engages the throttle lever E at one side. At the juncture of sections 11 and 12 open to way 9 it is preferred to provide a groove 13 longitudinally of the finger 7, for the reception of the terminal 14 of quadrant F.

As to finger 8 it is preferred to make this of flange like formation with a curved section 15 to engage the outside and conform to a section of the quadrant F, and a comparatively straight section 16 to engage laterally the throttle lever E at its side opposite to section 12.

These fingers 6, 7 and 8 thus provide ways of substantially V shape for the reception of elements of the vehicle and compel the user to first position the throttle lever in a closed position before the body J will fit the mechanism.

Lock K, in the example shown is an ordinary padlock including a shackle 17 which may be trained through a transverse aperture 18 in finger 8 at a portion thereof which confronts the finger 6 and in order that this shackle 17 may also embrace the quadrant F, and yet have the finger 6 extend substantially between quadrant F and casing D it is found desirable to provide a notch 19 in finger 6 alined with aperture 18 so that when hooking or training the shackle into place it may engage in said notch 19.

In practice, the throttle lever is disposed in a closed position and the body J slipped into place by a downward movement. It may be necessary to slightly cant the body in the start so as to avoid any projection on the gear case D and in order to dispose the intermediate portion 5 in engagement with the casing. After the body J is in place as hereinbefore described, the lock K is brought into use, its shackle embracing the quadrant F as clearly shown in Fig. 1 of the drawing and extending through aperture 18, thus traversing the way 10 and preventing unauthorized removal of the body J from the mechanism.

It is desirable to dispose the projection 11 in close proximity to the axis of rotation of wheel A, since slight movement of the wheel permits of a shorter turn with a Ford motor vehicle than other makes and this projection 11 is intended to permit of only sufficient circumferential movement as to enable the removal of the vehicle from a place of danger, where work is to be carried, or in the garage but to limit movement of the wheel so as to prevent running or towing of the machine over the usual highways of travel.

I claim:

1. A locking device for motor vehicles comprising in combination a body including an intermediate portion, a projection at one side of said intermediate portion and three fingers in grouped spaced relation extending from the other side of said intermediate portion providing two converging ways open at one end of the body, one of said fingers having a transverse notch intermediate its ends and one of said fingers confronting said last mentioned finger having a transverse aperture alined with said notch, and a padlock including a shackle adapted to be trained through said aperture and engage in said notch in its movement said shackle traversing the way between said confronting fingers.

2. In a locking device, the combination with a motor vehicle steering wheel having spokes, a planetary gear casing below said wheel and a throttle lever, coöperating quadrant and quadrant arm therebelow, of a body having an intermediate portion engaging said gear casing, a projection extending upwardly from said intermediate portion, between the spokes of the wheel to limit the amplitude of circumferential movement thereof, and three fingers extending downwardly from said intermediate portion, said fingers in spaced apart relation and one disposed between the quadrant and gear casing and the other two fingers embracing the quadrant arm and throttle lever one of said last mentioned fingers provided with a transverse aperture, and a padlock including a shackle embracing the quadrant and extending through the said aperture to prevent unauthorized removal of said body.

3. In a locking device, the combination with a motor vehicle steering wheel having spokes, a planetary gear casing below said wheel and a throttle lever, coöperating quadrant and quadrant arm therebelow, of a body having an intermediate portion engaging said gear casing, a projection extending upwardly from said intermediate portion, between the spokes of the wheel to limit the amplitude of circumferential movement thereof, and three fingers extending downwardly from said intermediate portion, said fingers in spaced apart relation and one disposed between the quadrant and gear casing and the other two fingers embracing the quadrant arm and throttle lever one of said last mentioned fingers provided with a transverse aperture, and the other of said last mentioned fingers having a longitudinal groove receiving the terminal of the quadrant and a padlock including a shackle embracing the quadrant and extending through the said aperture to prevent unauthorized removal of said body.

4. In a locking device, the combination with a motor vehicle steering wheel having spokes, a planetary gear casing below said wheel and a throttle lever, coöperating quadrant and quadrant arm therebelow, of a body having an intermediate portion engaging said gear casing, a projection extending upwardly from said intermediate portion, between the spokes of the wheel to limit the amplitude of circumferential movement thereof, and three fingers extending downwardly from said intermediate portion, said fingers in spaced apart relation and one disposed between the quadrant and gear casing and the other two fingers of flange-like formation, one of which is angular in cross section with one flange portion engaging the quadrant arm at its outer side and the other flange portion engaging the throttle lever laterally, at one side and the other finger having a curved portion engaging and conforming to the outer edge of the quadrant and a comparatively straight portion leading from said curved portion and engaging the throttle lever laterally at the other side thereof, and a lock carried by one of said fingers and including a shackle engaging the quadrant, to prevent unauthorized removal of said body.

5. In a locking device, the combination with a motor vehicle steering wheel having spokes, a planetary gear casing below said wheel and a throttle lever, coöperating quadrant and quadrant arm therebelow, of a body having an intermediate portion engaging said gear casing, a projection extending upwardly from said intermediate portion, between the spokes of the wheel to limit the amplitude of circumferential movement thereof, and three fingers extending downwardly from said intermediate portion, said fingers in spaced apart relation and one disposed between the quadrant and gear casing and the other two fingers of flange like formation, one of which is angular in cross section with one flange portion engaging the quadrant arm at its outer side and the other flange portion engaging the throttle lever laterally, at one side with a longitudinal groove at the intersection of said angularly arranged portions for the reception of the terminal of said quadrant, and the other finger having a curved portion engaging and conforming to the outer edge of the quadrant and a comparatively straight portion leading from said curved portion and engaging the throttle lever laterally at the other side thereof, and a lock carried by one of said fingers and including a shackle engaging the quadrant, to prevent unauthorized removal of said body.

6. As an article of manufacture, a locking device for motor vehicles formed of a single body of material having an intermediate portion, three fingers extending from one side of said intermediate portion in grouped spaced relation providing two intersecting ways open at one end of the body, one of said three fingers being substantially intermediate the terminals of the other two fingers and the last mentioned two fingers being of flange like formation and in converging relation defining a V shaped way, one of the stems of said way to receive the quadrant, its supporting arm and the control lever of the vehicle, and the other stem of said way, a section of the quadrant, one of the fingers defining said last mentioned stem of the way provided with a transverse aperture for the reception of the shackle of a padlock, and a single extension at the other side of said intermediate portion to extend between spokes of the vehicle steering wheel.

ROBERT E. HARRIS.